(12) United States Patent
Ishida et al.

(10) Patent No.: US 6,905,796 B2
(45) Date of Patent: *Jun. 14, 2005

(54) LITHIUM SECONDARY BATTERY

(75) Inventors: Akiko Ishida, Moriguchi (JP); Ken Nishimura, Moriguchi (JP); Masahiko Ogawa, Takarazuka (JP); Nobuo Eda, Hirakata (JP); Masaki Kitagawa, Katano (JP); Tetsuhisa Sakai, Moriguchi (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,681

(22) Filed: Mar. 12, 1998

(65) Prior Publication Data

US 2002/0006552 A1 Jan. 17, 2002

(30) Foreign Application Priority Data

Mar. 13, 1997 (JP) .............................. 9-058941
Mar. 13, 1997 (JP) .............................. 9-058964

(51) Int. Cl.[7] .......................... H01M 4/62; H01M 10/40
(52) U.S. Cl. .................... 429/209; 429/231.8; 429/232; 429/303; 429/332
(58) Field of Search ................................ 429/300, 302, 429/303, 231.1, 231.8, 213, 232, 235, 248, 251, 252, 320, 209, 332

(56) References Cited

U.S. PATENT DOCUMENTS

| | | | |
|---|---|---|---|
| 4,127,703 A | * 11/1978 | Holleck | 429/101 |
| 5,529,707 A | 6/1996 | Kejha | 252/622 |
| 5,545,496 A | * 8/1996 | Chang et al. | 429/231.5 |
| 5,599,355 A | * 2/1997 | Nagasubramanian et al. | 29/623.5 |
| 5,648,011 A | * 7/1997 | Blonsky | 252/62.2 |
| 5,677,084 A | * 10/1997 | Tsukamoto et al. | 429/231.3 |
| 5,756,231 A | * 5/1998 | Andrei et al. | 204/291 |
| 5,849,432 A | * 12/1998 | Angell et al. | 429/190 |
| 5,888,666 A | * 3/1999 | Kawakami | 429/62 |

FOREIGN PATENT DOCUMENTS

| | | |
|---|---|---|
| EP | 0 284 104 | 9/1988 |
| EP | 0 379 372 | 7/1990 |
| EP | 0836238 | 4/1998 |
| JP | 04206168 | 7/1992 |
| JP | 5-109310 | 4/1993 |
| JP | 7-153495 | 6/1995 |
| JP | 07-153495 A | * 6/1995 |
| JP | 7-153496 | 6/1995 |
| JP | 7-235293 | 9/1995 |
| JP | 08031407 | 2/1996 |
| JP | 8-298121 | * 11/1996 |
| JP | 08-321301 | 12/1996 |
| JP | 8-321301 | * 12/1996 |
| JP | 9-22732 | 1/1997 |
| JP | 9-306543 | * 11/1997 |
| JP | 10-116513 | 5/1998 |
| JP | 10-188957 | 7/1998 |
| WO | 94/24715 | 10/1994 |
| WO | WO 95/06332 | 3/1995 |
| WO | 97/01870 | 1/1997 |

* cited by examiner

Primary Examiner—Jonathan Crepeau
(74) Attorney, Agent, or Firm—Ratner Prestia

(57) ABSTRACT

A lithium secondary battery has high capacity and excellent current characteristics. The lithium battery comprises of a positive electrode, a negative electrode and an electrolyte; the negative electrode comprising $Al_2O_3$ particles not relating to the charge-and discharge reactions of the battery. The presence of the ceramics particles in the electrode leads to a decrease in the internal resistance of the battery because of the enhancement of ion conductivity in the electrode, resulting in higher capacity at high rate discharge of the lithium secondary battery.

6 Claims, 6 Drawing Sheets

LITHIUM SECONDARY BATTERY

BACKGROUND OF THE INVENTION

The present invention relates to a lithium secondary battery, and more particularly to its electrode.

The lithium battery, in particular, the rechargeable lithium secondary battery is intensively researched and developed recently as a new secondary battery having high voltage and high energy density. In earlier studies, the lithium secondary battery using lithium metal in the negative electrode has been highly expected as the battery of high energy density. However, when lithium metal is used in the negative electrode, dendric lithium formed at the time of charging is grown in the course of charging and discharging of battery, which leads to internal short circuit of battery or abnormal temperature rise of battery. Such safety problems have not been solved yet.

To solve these problems, instead of using lithium metal alone, it has been attempted to use an alloy of lithium metal with low melting metal such as aluminum, lead, indium, bismuth or cadmium, as the negative electrode. In these cases, however, as charging and discharging are repeated, pulverized alloy penetrates through the separator to cause internal short circuit, and it is far from practical and the problems are not solved.

Recently, to solve the problems, using carbon in the negative electrode, the lithium secondary battery using transition metal compound containing lithium in the positive electrode is coming into the mainstream. In this battery system, since charging and discharging are done by occlusion and release of lithium ions into carbon in the negative electrode, dendrite is not formed by charging. Hence, the battery has an excellent cycle characteristic and is excellent in safety.

In the existing lithium secondary battery, as mentioned above, carbon is used as active substance in the negative electrode, and charging and discharging are effected by occlusion and release of lithium ions into carbon. When powder is used as active substance, required conditions of the negative electrode of the battery include, aside from the lithium ion occluding and releasing capacity of the carbon itself, the filling performance of filling the limited volume of the battery with how much carbon. In the lithium secondary battery, usually, a mixed paste of carbon and adhesive is applied on both sides or one side of thin metal films used as current collectors, and the obtained plates are dried and rolled to form electrodes. In the plates of high capacity type having such high filling performance, it is a technical problem to accelerate ion conduction in the limited gap existing in the active substance grain boundary. That is, by obtaining a smoother ion diffusion in the negative electrode, the internal resistance of the electrode is curtailed, and the lithium secondary battery of high capacity is realized also in high rate discharge.

Further researches are also made into the lithium secondary battery using polymer electrolyte, instead of organic electrolyte solution, as the electrolyte, and it is expected as a lithium secondary battery of next generation featuring small size, light weight, and freedom of shape. However, the ion conductivity of polymer electrolyte is about $10^4$ S/cm at most, which is about two digits lower as compared with the organic electrolyte solution. Hence, to obtain a conductivity similar to that of the organic electrolyte solution, gel electrolyte impregnating organic electrolyte solution in polymer is used. The gel electrolyte is manufactured, for example, in the following method as disclosed in Japanese Laid-open Patent No. 5-109310. A mixed solvent composed of an optical crosslinking polymer of polyethylene glycol diacrylate, an optical crosslinking monomer of trimethylol propane ethoxylated triacrylate, an electrolyte solution solvent of propylene carbonate or polyethylene oxide, an electrolyte salt of $LiCF_3SO_3$, and others is applied on a flat plate, and it is irradiated with electron beams to polymerize and cure the monomer, so that a transparent and soft film of gel electrolyte is obtained. In the gel electrolyte, since ion conduction is mostly conducted through electrolyte solution phase, a high ion conductivity of about $3\times10^5$ S/cm can be obtained at room temperature.

In the lithium polymer secondary battery, as the substitute for separator used in the ordinary battery system, the polymer electrolyte is bonded with positive electrode and negative electrode, and the battery is composed. In the case of an ordinary secondary lithium battery using organic electrolyte solution, the positive electrode is composed of active substance, conductive agent and bonding agent, and electrolyte solution is impregnated, so that a favorable electrochemical interface with the active substance is obtained. However, the gel electrolyte which is a solid form lacks fluidity, and hardly permeates into the inside of the electrode. Accordingly, a compound electrode containing polymer electrolyte preliminarily in the electrode is formed, and it is bonded with the polymer electrolyte to fabricate the battery.

However, the conventional gel polymer electrolyte described above is characterized by containing organic electrolyte solution, and although the polymer electrolyte shows a high ion conductivity, it has not reached the level of organic electrolyte solution yet in terms of characteristics. When the battery is composed by introducing this polymer electrolyte into the electrode, owing to the low ion conductivity of the electrolyte itself, the internal resistance of the electrode is increased, and the charging and discharging capacity of the battery is extremely spoiled. Hence, to fabricate the battery of high capacity type, it is required to enhance the ion conductivity of polymer electrolyte in the electrode, and compose a battery of low internal resistance.

SUMMARY OF THE INVENTION

A lithium secondary battery is composed of a positive electrode, a negative electrode, and an electrolyte, and at least one of the positive electrode and negative electrode contains ceramic not responsible for charging and discharging reaction of the battery.

According to the invention, by mixing ceramic particles in the electrode, either positive electrode or negative electrode, the ion conductivity is enhanced, and the internal resistance of the electrode is lowered. By combining such positive and negative electrode for lithium battery and the electrolyte, a lithium secondary battery of high capacity particularly in high rate discharge is obtained.

At the same time, by adding ceramic particles in the plates, the plate strength is increased, and the lithium secondary battery excellent in cycle life characteristic can be manufactured.

As disclosed in Japanese Laid-open Patent No. 8-509100, an inorganic filler such as alumina or silanated fumed silica is added in the electrolyte, and the mechanical strength of the separator film is increased, and the electrolyte absorption level is heightened, but its constitution is different from the present invention in which ceramic particles are contained in the electrode, and it is also different in purpose, action and effect from the present invention which is intended to enhance the ion conductivity and lower the internal resistance of the battery.

In Japanese Laid-open Patent No. 7-235293, it is claimed that the electron conductivity is enhanced by using the active substance, having a compound mainly composed of semimetal belonging to group IV-B or V-B of periodic table as the dopant. It is the reformation of the active substance itself of the negative electrode, and is different from the present invention in its purpose and means. Besides, by adding $Al_2O_3$, $In_2O_3$, $SnO_2$, ZnO in the positive electrode in Japanese Laid-open Patent No. 7-153495, or mixing BaO, MgO, CaO in the positive electrode in Japanese Laid-open Patent No. 7-153496, it is reported that the stability of the positive electrode active substance having lithium ions de-doped in charged state is enhanced, thereby improving the capacity deterioration in the course of charging and discharging cycles. It is only intended to stabilize the positive electrode active substance by adding to the electrode, which is radically different from the constitution, action and purpose of the present invention in which additives are added to the negative electrode of the lithium ion battery.

DETAILED DESCRIPTION OF THE PREFERRED EMBODIMENTS

The invention relates to a lithium secondary battery using electrodes containing ceramic particles in at least one of positive electrode and negative electrode. By containing ceramics in the electrode, the ion conductivity is enhanced, so that a lithium secondary battery of low internal resistance is obtained. As a result, the lithium secondary battery capable of charging and discharging at high rate and higher in capacity is obtained.

The ceramic is at least one selected from the group consisting of $Al_2O_3$, $SiO_2$, $ZrO_2$, MgO and $Na_2O$. The ceramic is used in particles, and the particle size should be 10 microns or less. For transmission of lithium ions, the surface porous portion of ceramic particles, more specifically the porous volume is responsible, and by using ceramic particles of small particle size and wide surface area, more effective ion diffusion capacity is obtained.

The ceramic content is 0.01 to 20 parts by weight in 100 parts by weight of active substance. By the presence of ceramic particles, the ion conductivity of electrode is enhanced, but its effect appears at 0.01 parts by weight or more, and if too much ceramic is present in the electrode, the electrolyte volume as the ion transmission route decreases suddenly, and therefore the ceramic to be mixed in the electrode is appropriately 20 wt. % or less. More preferably, it may be 10 wt. % or less, so that a lithium secondary battery of high capacity is obtained.

The invention relates to a lithium secondary battery containing polymer electrolyte in at least one of positive electrode and negative electrode. The solid electrolyte lacks fluidity, and hence hardly permeates into the electrode, and therefore by preliminarily containing electrolyte in the electrode to obtain a compound electrode, so that the ion conductivity is enhanced.

The polymer electrolyte is a gel polymer electrolyte composed of polymer and organic electrolyte solution dissolving lithium salt. As a result, the ion conductivity of electrolyte is enhanced.

Moreover, ceramic is contained in the polymer electrolyte. As a result, the ion conductivity in the polymer electrolyte is enhanced, and a lithium secondary battery of lower internal resistance is obtained.

The ceramic in the electrolyte is at least one kind selected from the group consisting of $Al_2O_3$, $SiO_2$, $ZrO_2$, MgO and $Na_2O$.

The ceramic particles should be 10 microns or less in particle size.

EXAMPLE 1

Using a polymer electrolyte compound positive electrode mixing $Al_2O_3$ particles, a lithium polymer secondary battery of the invention was fabricated.

Figure 1:
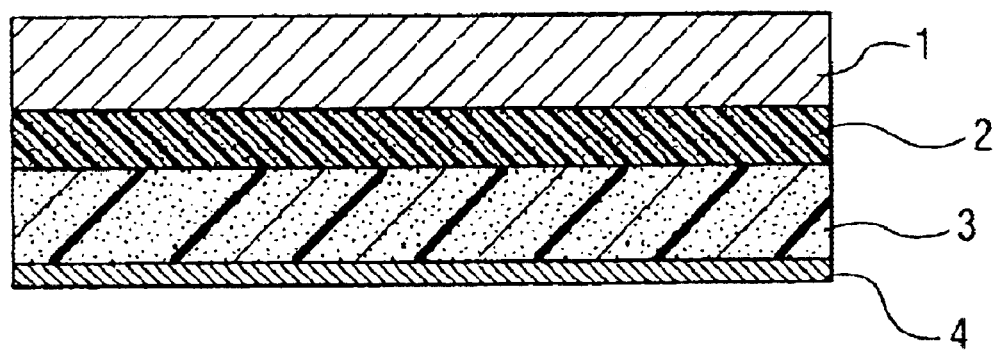
FIG. 1 is a longitudinal sectional view of a power generating element of a lithium polymer secondary battery of an example of the invention.

FIG. 1 is a longitudinal sectional view of a lithium polymer secondary battery of the invention. In the diagram, reference numeral 1 is a lithium metal negative electrode, and 3 is a compound positive electrode containing polymer electrolyte mixing $Al_2O_3$ particles. Besides, reference numeral 2 is a gel polymer electrolyte layer, and 4 is an aluminum-made current collecting foil of positive electrode.

The polymer electrolyte compound positive electrode 3 mixing $Al_2O_3$ particles was fabricated in the following manner. First, as monomer, $Al_2O_3$ particles with particle size of 0.5 micron were added by 10 parts by weight to 20 parts by weight of polyethylene glycol diacrylate, and stirred. Adding 0.5 part by weight of thermal polymerization initiator and 70 parts by weight of nonaqueous electrolyte solution, the mixture was stirred by a ball mill, and a thermal polymerizable polymer electrolyte cured solution uniformly dispersing $Al_2O_3$ particles was obtained. In succession, to 100 parts by weight of $V_6O_{13}$ active substance, 6 parts by weight of acetylene black and 50 parts by weight of the thermal polymerizable polymer electrolyte cured solution were injected and kneaded. This paste of positive electrode compound was applied on an aluminum foil which is a positive electrode current collector, and by heating for 1 hour at 80, the monomer was polymerized and cured, and the polymer electrolyte compound positive electrode 3 mixing 5 parts by weight of $Al_2O_3$ particles in 100 parts by weight of active substance was obtained.

Consequently, the gel polymer electrolyte layer 2 was fabricated in the following manner. First, as the monomer, mixing and stirring 0.1 part by weight of optical polymerization initiator and 70 parts by weight of nonaqueous electrolyte solution in 20 parts by weight of polyethylene glycol diacrylate, an optical polymerizable polymer electrolyte curing solution was obtained. It was applied in a thickness of 50 microns, and an ultraviolet ray with maximum output wavelength of 365 nm was emitted for 3 minutes. As a result, the monomer was polymerized and cured, and a gel polymer electrolyte layer 2 containing nonaqueous electrolyte solution was obtained.

This gel polymer electrolyte layer 2 was bonded and laminated with lithium metal negative electrode 1 and polymer electrolyte compound positive electrode 3, and the coin type lithium polymer secondary battery of the invention was composed.

Herein, the thermal polymerization initiator was azoisobutylonitrile, the optical polymerization initiator was benzyl dimethyl ketal, and the nonaqueous electrolyte solution was an equally mixed solvent of propylene carbonate and ethylene carbonate by 50:50 by volume, dissolving 1 mol/liter of $LiPF_6$ as a solute.

EXAMPLE 2

The coin type lithium polymer secondary battery of the invention was composed in the same manner as in example 1, except that the particle size of $Al_2O_3$ particles to be mixed in the polymer electrolyte compound positive electrode 3 was fixed at 0.5 micron, and that the additive rate in 100 parts by weight of active substance was 5, 10, 20 and 30 parts by weight.

EXAMPLE 3

The coin type lithium polymer secondary battery of the invention was composed in the same manner as in example 1, except that the additive rate of $Al_2O_3$ particles mixed in the polymer electrolyte compound positive electrode 3 was fixed at 5 parts by weight in 100 parts by weight of active substance, and that the particle size of $Al_2O_3$ particles was 0.5, 1.0, 10 and 20 microns.

EXAMPLE 4

The coin type lithium polymer secondary battery of the invention was composed in the same manner as in example 1, except that $Al_2O_3$ particles were contained in the gel polymer electrolyte layer.

The gel polymer electrolyte layer containing $Al_2O_3$ particles was manufactured in the following manner. First, as monomer, 10 parts by weight of $Al_2O_3$ particles with particle size of 0.5 micron were added and stirred in 20 parts by weight of polyethylene glycol diacrylate. Adding 0.1 part by weight of optical polymerization initiator and 70 parts by weight of nonaqueous electrolyte solution, the mixture was stirred by a ball mill, and an optical polymerizable polymer electrolyte cured solution uniformly dispersing $Al_2O_3$ particles was obtained. It was applied in a thickness of 50 microns, and an ultraviolet ray with maximum output wavelength of 365 nm was emitted for 3 minutes. As a result, the monomer was polymerized and cured, and gel polymer electrolyte layer containing nonaqueous electrolyte solution and dispersing $Al_2O_3$ particles was obtained.

This gel polymer electrolyte layer dispersing $Al_2O_3$ particles was bonded and laminated with lithium metal negative electrode 1 and polymer electrolyte compound positive electrode 3 same as in example 1, and the coin type lithium polymer secondary battery of the invention was composed.

EXAMPLE 5

A lithium polymer secondary battery of the invention was composed by using a polymer electrolyte compound negative electrode mixing $Al_2O_3$ particles.

Figure 2:
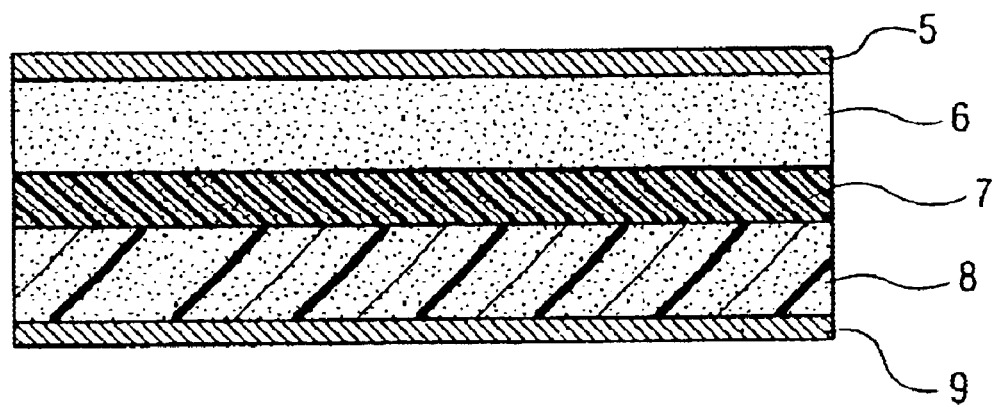
FIG. 2 is a longitudinal sectional view of a power generating element of a lithium polymer secondary battery in other embodiment of the invention.

FIG. 2 shows a longitudinal sectional view of a lithium polymer secondary battery in other embodiment of the invention. In the diagram, reference numeral 5 is a negative electrode current collector, and a polymer electrolyte compound negative electrode 6 mixing $Al_2O_3$ particles is applied. It is laminated with a polymer electrolyte compound positive electrode 8 applied on a positive electrode current collector 9 with a gel polymer electrolyte 7 in between.

The polymer electrolyte compound negative electrode 6 mixing $Al_2O_3$ particles was manufactured in the following manner. First, to the monomer of 20 parts by weight of polyethylene glycol diacrylate, $Al_2O_3$ particles with particle size of 0.5 micron was added and stirred by 10 parts by weight. Further adding 0.5 part by weight of thermal polymerization initiator and 70 parts by weight of nonaqueous electrolyte solution, the mixture was stirred by a ball mill, and a thermal polymerizable polymer electrolyte cured solution uniformly dispersing $Al_2O_3$ particles was obtained. In succession, as negative electrode active substance, to 90 parts by weight of graphite powder with particle size of 6 microns, polyvinylidene fluoride was mixed by 10 parts by weight as binder, and the thermal polymerizable polymer electrolyte cured solution was injected by 50 parts by weight and kneaded. This paste of negative electrode compound was applied on a copper foil of the negative electrode current collector 5, and dried at reduced pressure at 150, and blanked, and the polymer electrolyte compound negative electrode 6 mixing 5 parts by weight of $Al_2O_3$ particles in 100 parts by weight of active substance was obtained.

The polymer electrolyte compound positive electrode 8 was fabricated in the following manner. First, to the monomer of 20 parts by weight of polyethylene glycol diacrylate, 0.5 part by weight of thermal polymerization initiator and 70 parts by weight of nonaqueous electrolyte solution were added and stirred, and a thermal polymerizable polymer electrolyte cured solution was obtained. In succession, to 100 parts by weight of $LiCoO_2$ as positive electrode active substance, 3 parts by weight of acetylene black and 50 parts by weight of the thermal polymerizable polymer electrolyte curing solution were injected and kneaded. This paste of positive electrode compound was applied on an aluminum foil of the positive electrode current collector 9, and by heating for 1 hour at 80, the monomer was polymerized and cured, and the polymer electrolyte compound positive electrode 8 was obtained.

The gel polymer electrolyte layer 7 was fabricated in the same manner as in example 1. This gel polymer electrolyte layer 7 was bonded and laminated with the polymer electrolyte compound negative electrode 6 and polymer electrolyte compound positive electrode 8, and the coin type lithium polymer secondary battery of the invention was composed.

Herein, the thermal polymerization initiator was azoisobutylonitrile, the optical polymerization initiator was benzyl dimethyl ketal, and the nonaqueous electrolyte solution was a mixed solvent of ethylene carbonate and ethyl methyl carbonate by 25:75 by volume, dissolving 1.5 mol/liter of $LiPF_6$ as a solute.

EXAMPLE 6

The coin type lithium polymer secondary battery of the invention was composed in the same manner as in example 5, except that $Al_2O_3$ particles were contained in the gel polymer electrolyte layer.

The gel polymer electrolyte containing $Al_2O_3$ particles was manufactured in the same manner as in example 4.

The gel polymer electrolyte layer containing $Al_2O_3$ particles was bonded and laminated with the polymer electrolyte compound negative electrode 6 and polymer electrolyte compound positive electrode 8, and the coin type lithium polymer secondary battery of the invention was composed.

EXAMPLE 7

A lithium polymer secondary battery of the invention was composed by using the polymer electrolyte compound negative electrode and positive electrode mixing $Al_2O_3$ particles.

The coin type lithium polymer secondary battery of the invention was composed in the same manner as in example 6, except that $Al_2O_3$ particles were contained in the polymer electrolyte compound positive electrode.

The polymer electrolyte compound positive electrode mixing $Al_2O_3$ particles was manufactured in the following manner. First, to the monomer of 20 parts by weight of polyethylene glycol diacrylate, $Al_2O_3$ particles with particle size of 0.5 micron was added and stirred by 10 parts by weight. Further adding 0.5 part by weight of thermal polymerization initiator and 70 parts by weight of nonaqueous electrolyte solution, the mixture was stirred, and a thermal polymerizable polymer electrolyte cured solution was obtained. In succession, as positive electrode active substance, to 100 parts by weight of $LiCoO_2$, 3 parts by weight of acetylene black and 50 parts by weight of the thermal polymerizable polymer electrolyte cured solution were injected and kneaded. This paste of positive electrode compound was applied on an aluminum foil, and by heating for 1 hour at 80, the monomer was polymerized and cured, and the polymer electrolyte compound positive electrode mixing $Al_2O_3$ particles was obtained.

The polymer electrolyte compound positive electrode and polymer electrolyte compound negative electrode dispersing $Al_2O_3$ particles were bonded and laminated with the gel polymer electrolyte layer 7, and the coin type lithium polymer secondary battery of the invention was composed.

EXAMPLE 8

A cylindrical lithium ion secondary battery of the invention was composed by using a negative electrode mixing alumina ($Al_2O_3$) particles.

Figure 7:
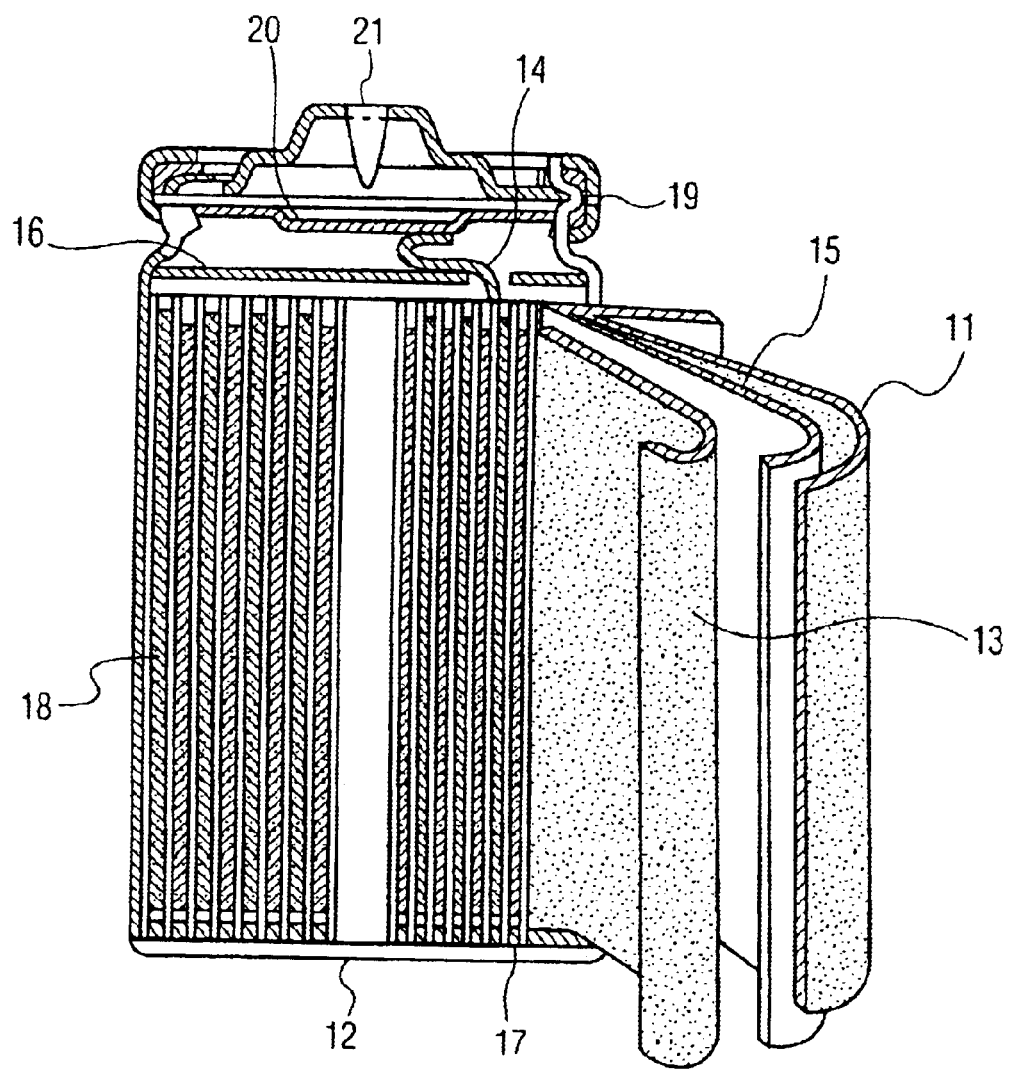
FIG. 7 is a longitudinal sectional view of a lithium ion secondary battery using electrodes of the invention.

FIG. 7 shows a longitudinal sectional view of a cylindrical lithium ion secondary battery of the invention. In the diagram, reference numeral 11 is a negative electrode mixing $Al_2O_3$ particles, and it was manufactured in the following manner. First, as negative electrode active substance, to 90 parts by weight of graphite powder, 10 parts by weight of polyvinylidene fluoride as binder and N-methyl-2-pyrrolidone as solvent were mixed, and a specified amount of $Al_2O_3$ particles with specified particle size were mixed and kneaded, and a paste was prepared. A specified amount of this compound was applied on both sides of a copper foil as negative electrode current collector, and dried, rolled, and cut to a specified size, and a negative electrode 11 for lithium secondary battery was fabricated. Reference numeral 13 is a positive electrode, and it was manufactured in the following manner. To 100 parts by weight of $LiCoO_2$ positive electrode active substance, 3 parts by weight of acetylene black and 9 parts by weight of aqueous dispersion of polytetrafluoroethylene were added and kneaded to prepare a paste. It was applied on both sides of an aluminum foil as positive electrode current collector, and dried and rolled, and cut to a specified size, and a positive electrode 13 for lithium ion secondary battery was obtained. Reference numeral 15 is a separator composed of a polyethylene microporous film, and it is interposed between the positive electrode 13 and negative electrode 11, and a spiral plate group is composed on the whole.

At upper and lower ends of the plate group, an upper insulator 16 and a lower insulator 17 of polypropylene are disposed, and the assembly is inserted into a nickel plated iron case 18. A positive electrode lead plate 14 is spot-welded to a titanium sealing plate 20 and a negative electrode lead plate 12, to the bottom of the case 18, and a specified amount of electrolyte solution is injected into the case, and the battery is sealed with the sealing plate 20 through a gasket 19, and a cylindrical lithium secondary battery of the invention is obtained. The battery measures 14 mm in diameter and 50 mm in height. Reference numeral 21 is a positive electrode terminal of the battery, and the battery case 18 serves as the negative electrode terminal. Herein, the electrolyte solution is a nonaqueous electrolyte solution dissolving 1.5 mol/liter of $LiPF_6$ in a mixed solvent of ethylene carbonate and ethyl methyl carbonate at 25:75 by volume.

EXAMPLE 9

The cylindrical lithium ion secondary battery of the invention was composed in the same manner as in example 8, except that the particle size of $Al_2O_3$ particles to be mixed in the negative electrode was fixed at 0.5 micron, and that the additive rate in 90 parts by weight of graphite and 10 parts by weight of binder was 0.01, 5, 10, 20 and 30 parts by weight.

EXAMPLE 10

The cylindrical lithium ion secondary battery of the invention was composed in the same manner as in example 8, except that the additive rate of $Al_2O_3$ particles mixed in the negative electrode was fixed at 5 parts by weight in 90 parts by weight of graphite and 10 parts by weight of binder, and that the particle size of $Al_2O_3$ particles was 0.5, 1.0, 10 and 20 microns.

COMPARATIVE EXAMPLE 1

The coin type lithium polymer secondary battery of the invention was composed in the same manner as in example 1, except that $Al_2O_3$ particles were not contained in the polymer electrolyte compound positive electrode.

COMPARATIVE EXAMPLE 2

The coin type lithium polymer secondary battery of the invention was composed in the same manner as in example 5, except that $Al_2O_3$ particles were not contained in the polymer electrolyte compound negative electrode.

COMPARATIVE EXAMPLE 3

The cylindrical lithium ion secondary battery of the invention was composed in the same manner as in example 8, except that $Al_2O_3$ particles were not contained in the negative electrode.

The characteristics of these batteries in examples 1 to 10 and comparative examples 1–b 3 were evaluated. The results are shown in FIG. 3 to FIG. 6, FIG. 8, and FIG. 9.

Figure 3:
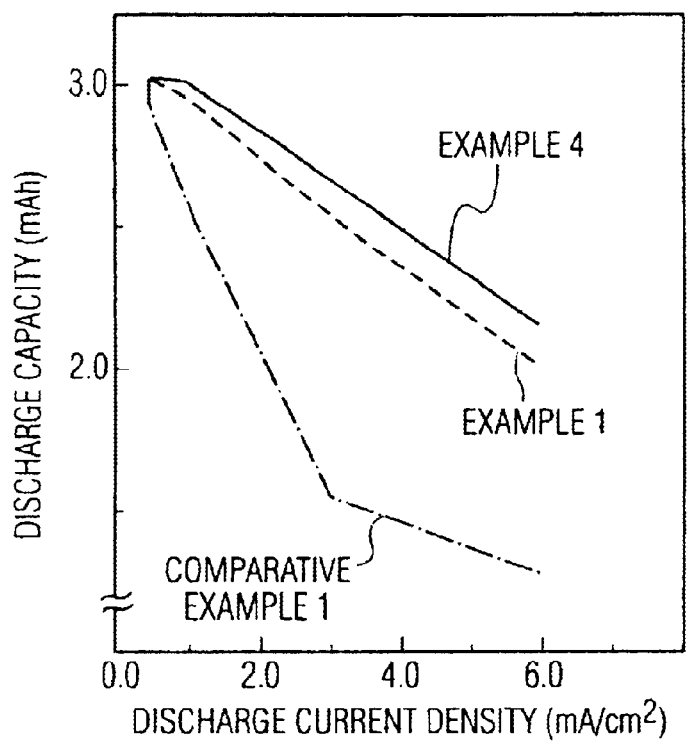
FIG. 3 is a diagram showing discharge capacity for discharge current density in a lithium polymer secondary battery.

In FIG. 3, the current-capacity characteristic of the coin type lithium polymer secondary batteries obtained in example 1, example 4, and comparative example 1 are expressed as the discharge capacity to the discharge current density. In the test, the battery was charged at a constant current of 0.5 mA/cm$^2$, and discharged at a current density of 0.5 to 6.0 mA/cm$^2$, in a voltage range of 1.8 to 3.3 V, at 20. As a result, as compared with the battery of comparative example 1, the battery of example 1 mixing $Al_2O_3$ particles in the positive electrode of the invention was extremely enhanced in the discharge capacity at the discharge current density of 1 mA/cm$^2$ or more. The battery in example 4 mixing $Al_2O_3$ fine particles also in the gel polymer electrolyte layer was further improved in the discharge capacity as compared with the battery of example 1.

Figure 4:
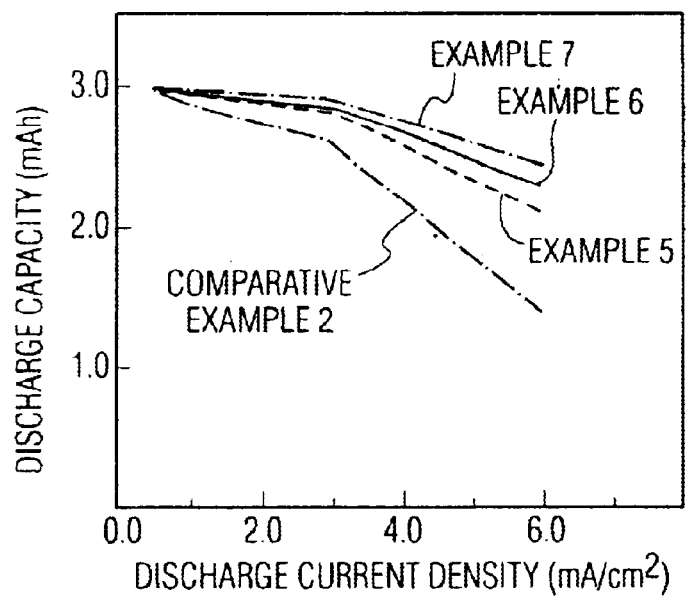
FIG. 4 is a diagram showing discharge capacity for discharge current density in a lithium polymer secondary battery.

In FIG. 4, the current-capacity characteristic of the coin type lithium polymer secondary batteries obtained in example 5 to example 7, and comparative example 2 are expressed as the discharge capacity to the discharge current density.

In the test, the battery was charged at a constant current of 0.5 mA/cm$^2$, and discharged at a current density of 0.5 to 6.0 mA/cm$^2$, in a voltage range of 3.0 to 4.2 V, at 20. As a result, as compared with the battery of comparative example 2, the battery of example 5 mixing $Al_2O_3$ particles in the negative electrode of the invention was enhanced in the capacity in a high discharge current density region. The battery in example 6 mixing $Al_2O_3$ particles also in the polymer electrolyte layer was further improved in the discharge capacity as compared with the battery of example 5. Moreover, a high capacity was recorded in the battery of example 7 mixing $Al_2O_3$ particles in the positive electrode, negative electrode and polymer electrolyte. In the battery of comparative example 2, at discharge of 6.0 mA/cm$^2$, the capacity is about 48% of that at discharge of 0.5 mA/cm$^2$, whereas in the battery of example 6, a high capacity maintenance rate of 77% was obtained.

Figure 5:
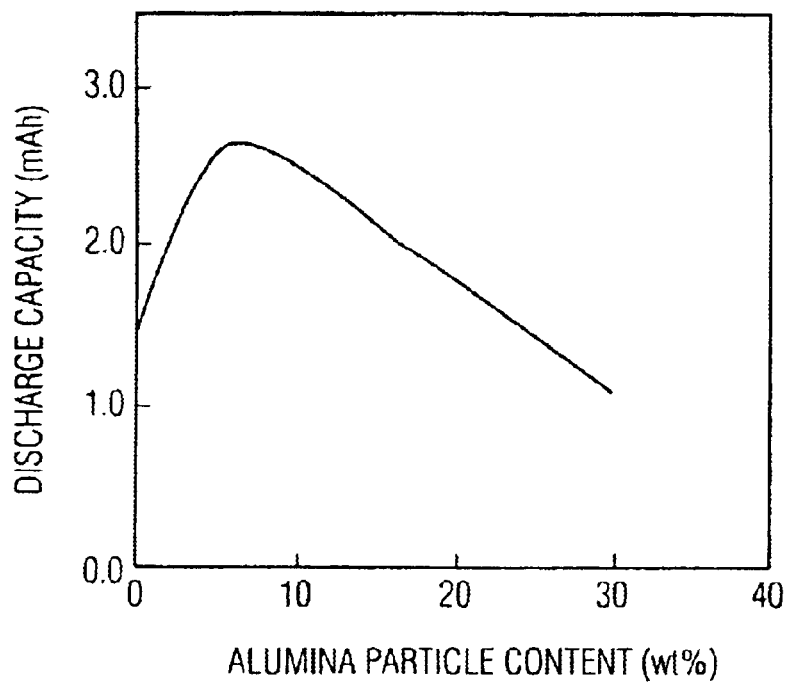
FIG. 5 is a diagram showing discharge capacity to additive rate of $Al_2O_3$ particles mixed in the positive electrode.

FIG. 5 is a diagram showing the discharge capacity in terms of the additive amount of $Al_2O_3$ particles mixed in the positive electrode of the coin type lithium polymer secondary battery using the polymer electrolyte compound positive electrode obtained in example 2. In the test, the battery was discharged at a current density of 3.0 mA/cm$^2$, and charged at 0.5 mA/cm$^2$, at 20. As a result, the discharge capacity increased along with the addition of $Al_2O_3$ particles, showing the maximum value of 2.6 mAh at 5 wt. %. However, at the additive rate of 20 wt. % or more, to the contrary, the discharge capacity decreased as compared with the battery without additive.

Figure 6:
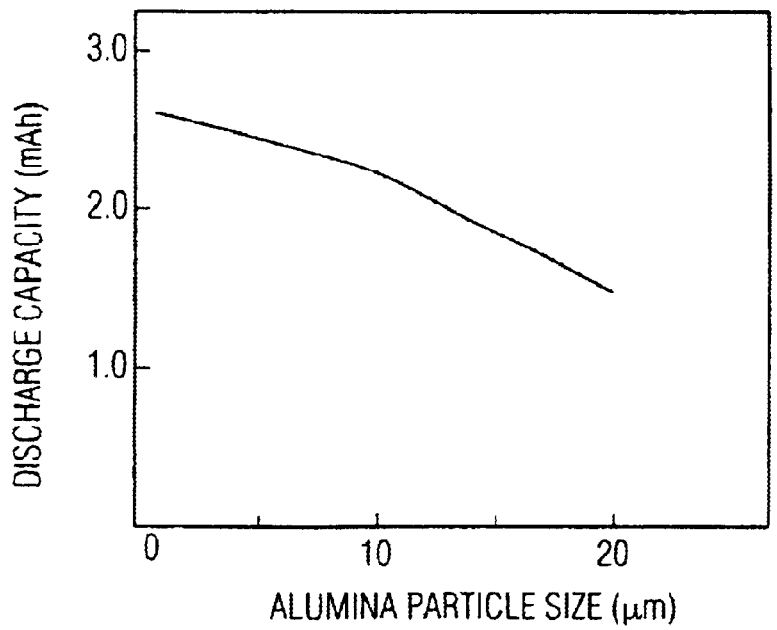
FIG. 6 is a diagram showing discharge capacity to particle size of $Al_2O_3$ particles mixed in the positive electrode.

FIG. 6 is a diagram showing the discharge capacity in terms of the particle size of $Al_2O_3$ particles mixed in the positive electrode of the coin type lithium polymer secondary battery using the polymer electrolyte compound positive electrode obtained in example 3. In the test, the battery was discharged at a current density of 3.0 mA/cm$^2$, and charged at 0.5 mA/cm2, at 20. As a result, the discharge capacity increased along with the decrease of particle size, and a high capacity over 2.0 mAh was obtained at particle size of 10 microns or less.

As a result of measurement of X-ray diffraction of the positive electrode and negative electrode after charging and discharging, there was no difference in the peak of $Al_2O_3$. Hence, it is estimated that $Al_2O_3$ is not related to charging and discharging.

Figure 8:
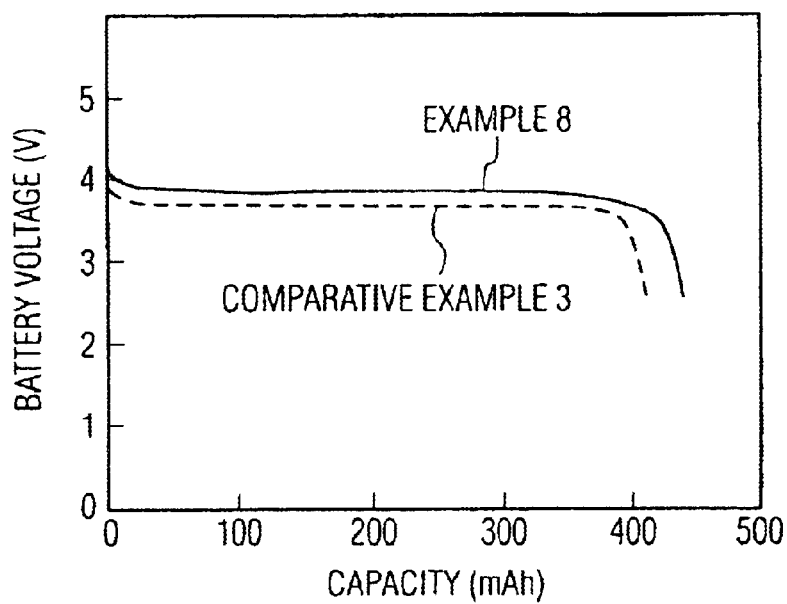
FIG. 8 is a diagram showing a discharge curve of lithium secondary battery.

FIG. 8 shows the discharge curve at the tenth cycle of the lithium secondary batteries obtained in example 8 and comparative example 3. In the test, the battery was charged at a constant current of 100 mA and discharged at 500 mA, the charge end voltage was 4.2 V and discharge end voltage was 3.0 V, and the cycle test was conducted in the environments at 20. As a result, the battery of comparative example 3 had a capacity of 405 mAh, and the battery of the invention in example 8 mixing $Al_2O_3$ particles in the negative electrode was increased in capacity by 6% to 430 mAh. This is because the internal resistance of the battery is low, the voltage drop in discharge is small, and a high voltage is maintained.

Figure 9:
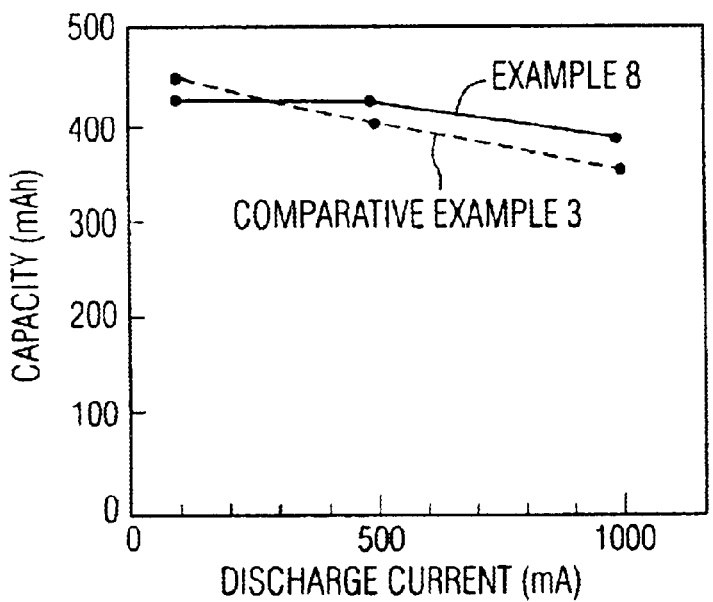
FIG. 9 is a diagram showing rate characteristic of lithium secondary battery.

In FIG. 9, the current-capacity characteristics of the lithium secondary batteries obtained in example 8 and comparative example 3 are expressed as the discharge capacity to the discharge current. In the test, the battery was charged at a constant current of 100 mA, and discharged at 100, 250, 500, and 1000 mA. In low rate discharge at 100 mA, in the battery of example 8 mixing $Al_2O_3$ particles in the negative electrode, the capacity was decreased by 4% as compared with the battery of comparative example 3 due to decline of quantity of active substance, but in high rate discharge at 250 mA and higher, the capacity was improved. Besides, the battery of comparative example 3, in discharge at 1000 mA, the capacity was about 83% that in discharge at 100 mA, while a high capacity maintenance rate of 90% was observed in the battery of example 8.

In the test, the battery of example 9 was charged at 100 mA and discharged at 500 mA at 20. As a result, the discharge capacity increased together with the addition of $Al_2O_3$ particles, showing the maximum value of 430 mAh at 5 wt. %. However, at 20 wt. % or more, to the contrary, the discharge capacity decreased due to addition. This seems because quantities of ceramic fine particles are present in the electrode and the electrolyte volume as the ion transmission route is decreased suddenly. Hence, ceramic fine particles to be mixed in the electrode should be preferably 20 wt. % or less, and a lithium secondary battery of high capacity is obtained at this time.

The discharge capacity in terms of particle size of $Al_2O_3$ particles mixed in the negative electrode of the lithium secondary battery obtained in example 10 was improved as the particle size of mixed $Al_2O_2$ particles decreased, and a high capacity of over 420 mAh was obtained at particle size of 10 microns or less. This is considered because the surface porous portion of ceramic particles, more specifically, the porous volume is closely related to transmission of lithium ions, and an effective ion diffusion is achieved by using ceramic particles of small particle size and wide surface area.

In both charge and discharge states, the X-ray diffraction analysis of the negative electrode after charging and discharging disclosed no difference in $Al_2O_3$ peaks. Hence, $Al_2O_3$ is not considered to be related to occlusion and release of lithium.

Moreover, the cycle characteristics of the lithium secondary batteries of example 8 and comparative example 3 were studied. The battery test was conducted at the discharge current of 500 mA, upper limit end voltage of 4.2 V, lower limit end voltage of 3.0 V, and in the environment of 20. Results of discharge capacity at 0, 100, and 500 cycles are shown in Table 1.

TABLE 1

|  | Initial capacity (mAh) | Capacity after 100 cycles (mAh) | Capacity after 500 cycles (mAh) |
|---|---|---|---|
| Example 8 | 430 | 414 | 404 |
| Comparative example 3 | 405 | 376 | 365 |

As clear from Table 1, in the battery of comparative example 3, the capacity decrease to 93% of initial capacity in 100 cycles, and 90% in 500 cycles, but the battery of example 8 of the invention maintained 94% of initial capacity after 500 cycles. The battery was decomposed after 500 cycles, and the negative electrode was observed, and the plate of example 8 containing $Al_2O_3$ was less in dropout of negative electrode compound and higher in strength as compared with the plate of comparative example 3 without additive.

EXAMPLE 11

A lithium polymer secondary battery of the invention was composed by using a polymer electrolyte compound positive electrode mixing $Al_2O_3$ particles.

Figure 10:
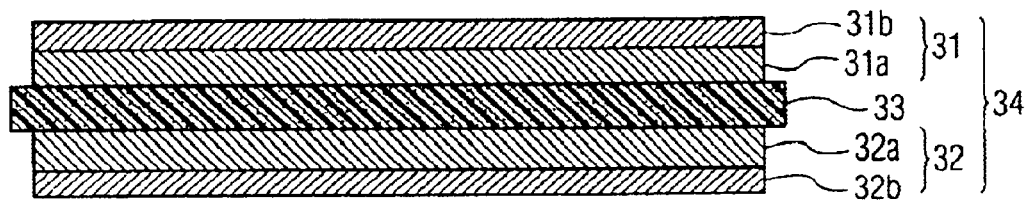
FIG. 10 is a longitudinal sectional view of a power generating element of a lithium polymer secondary battery of an example of the invention.

FIG. 10 is a longitudinal sectional view of the lithium polymer secondary battery of the invention. In the diagram, a positive plate 31 is a laminated structure of a positive electrode active substance layer 31a and a positive electrode current collector 31b. A negative plate 32 is similarly a laminated structure of a negative electrode active substance layer 32a and a negative electrode current collector 32b. A polymer electrolyte 33 is placed between the positive plate and negative plate, and is integrated with the positive plate and negative plate by hot melting or casting method.

The positive electrode current collector 31b is a punching metal or lath metal composed of aluminum metal or conductive material coated with aluminum, and a mixture of conductive carbon material such as acetylene black, Ketchen Black, or carbon fiber, and a binder such as polyvinylidene fluoride is bonded to the surface.

The negative electrode current collector 32b is a punching metal or lath metal composed of nickel metal or conductive material coated with copper or nickel, and a mixture of conductive carbon material such as acetylene black, Ketchen Black, or carbon fiber, and a binder such as polyvinylidene fluoride is bonded to the surface.

In the method of binding the conductive carbon material to the current collector, for example, acetylene black is dispersed in N-methyl pyrrolidone solution of polyvinylidene fluoride, and this solution is directly applied on the current collector, and the solvent, N-methyl pyrrolidone, is dried and removed.

The positive electrode active substance layer 31a and negative electrode active substance layer 32a are fabricated by applying a paste composed of active substance, conductive material, and polymer solution on a glass plate, and drying and removing the solvent. The positive electrode active substance layer 31a, positive electrode current collector 31b, negative electrode active substance layer 32a, and negative electrode current collector 32b are melted by heat roller to prepare the positive plate 31 and negative plate 32, and the polymer electrolyte 33 is laminated with the positive plate 31 and negative plate 32, and melted by heat roller to prepare the laminate electrode 34.

The laminate electrode 34 is inserted into the laminate sheet housing, and from the opening of the housing, an electrolyte solution dissolving 1 mol/liter of lithium phosphate hexafluoride in a mixture of ethylene carbonate and ethyl methyl carbonate at 1:3 by volume is poured in. After pouring the solution, the inside of the housing is evacuated and heated to impregnate the electrolyte solution sufficiently in the laminate electrode, and is then returned to atmospheric pressure, and the opening of the housing is sealed by heat seal, and the organic electrolyte battery of the invention is obtained.

A lithium polymer secondary battery of the invention using polymer electrolyte compound positive electrode mixing $Al_2O_3$ particles was prepared in the following procedure.

In 160 g of acetone, 45 g of copolymer of vinylidene fluoride and propylene hexafluoride (hereinafter called P(VDF-HFP) (ratio of propylene hexafluoride 12% by weight) is dissolved, and 45 g of di-n-butyl phthalate (DBP) is added to prepare a mixed solution. This solution is applied on a glass plate in a deposition thickness of 0.5 mm, and acetone is dried and removed, and a polymer electrolyte sheet of 0.08 mm in thickness and 40 mm 70 mm in size is prepared.

As the positive electrode sheet, 90 g of P(VDF-HFP) is dissolved in 1300 g of acetone, and 1000 g of lithium cobaltate, 60 g of acetylene black, 135 g of DBP, and 100 g of $Al_2O_3$ particles with particle size of 0.5 micron are mixed and the prepared paste is applied on a glass plate in a deposition thickness of 0.9 mm, and acetone is dried and removed, and a sheet of 0.3 mm in thickness and 30 mm 60 mm in size is obtained.

As the negative electrode sheet, 45 g of P(VDF-HFP) is dissolved in 300 g of acetone, and 260 g of spherical graphite (Osaka Gas) composed of carbon mesophase spheres transformed into carbon and graphite, 20 g of vapor phase growth carbon fiber transformed into graphite (VGCF) (Osaka Gas), and 65 g of DBP are mixed, and the prepared paste is applied on a glass plate in a deposition thickness of 1.2 mm, and acetone is dried and removed, and a sheet of 0.35 mm in thickness and 30 mm 60 mm in size is obtained.

The mixture of conductive carbon material and binder to be applied on the current collector is prepared by dispersing and mixing 30 g of acetylene black and N-methyl pyrrolidone solution (12 wt. %) of polyvinylidene fluoride. This mixture is applied on a lath metal of aluminum and copper of 0.06 mm in thickness, and by drying and removing N-methyl pyrrolidone at temperature of 80 or higher, the current collector is prepared.

The laminated structure of the positive electrode sheet and current collector of aluminum is laminated with polytetrafluoroethylene sheet (PTFE, 0.05 mm thick), and heated and pressurized by passing through two rollers heated at 150 to melt. The PTFE is used to prevent the active substance layer from adhering to the rollers, and other material such as copper foil or aluminum foil may be used.

In the same manner, the negative plate is prepared by using the negative electrode sheet and copper current collector.

Finally, the polymer electrolyte is laminated with the positive plate and negative plate, and heated and pressurized by two rollers heated at 120 to melt and integrate, thereby composing a composition battery. The integrated composition battery is immersed in diethyl ether, and DBP is extracted and removed, and dried in vacuum at 50.

Finally, in the integrated composition battery, an electrolyte solution dissolving 1.5 mol/liter of lithium phosphate hexafluoride in a mixture of ethylene carbonate and ethyl methyl carbonate at 1:3 by volume is poured. After pouring the solution, the inside of the housing is evacuated and heated to impregnate the electrolyte solution sufficiently in the laminate electrode, and is returned to atmospheric pressure, and the opening of the housing is sealed by heat seal, and the lithium polymer secondary battery of the invention is obtained.

EXAMPLE 12

A lithium polymer secondary battery of the invention was prepared in the same manner as in example 11, except that $Al_2O_3$ particles with particle size of 0.5 micron same as used in example 11 were contained in the polymer electrolyte.

The polymer electrolyte mixing $Al_2O_3$ particles was prepared in the following manner.

In 160 g of acetone, 30 g of copolymer of vinylidene fluoride and propylene hexafluoride (hereinafter called P(VDF-HFP) (ratio of propylene hexafluoride 12% by weight) is dissolved, and 30 g of di-n-butyl phthalate (DBP) is added, and $Al_2O_3$ particles with particle size of 0.5 microns are added to this mixed solution. This solution is applied on a glass plate in a deposition thickness of 0.5 mm, and acetone is dried and removed, and a polymer electrolyte sheet of 0.08 mm in thickness and 40 mm 70 mm in size is prepared.

COMPARATIVE EXAMPLE 4

A lithium polymer secondary battery of comparative example was prepared in the same manner as in example 11, except that $Al_2O_3$ particles are not contained in the polymer electrolyte compound positive electrode.

Figure 11:
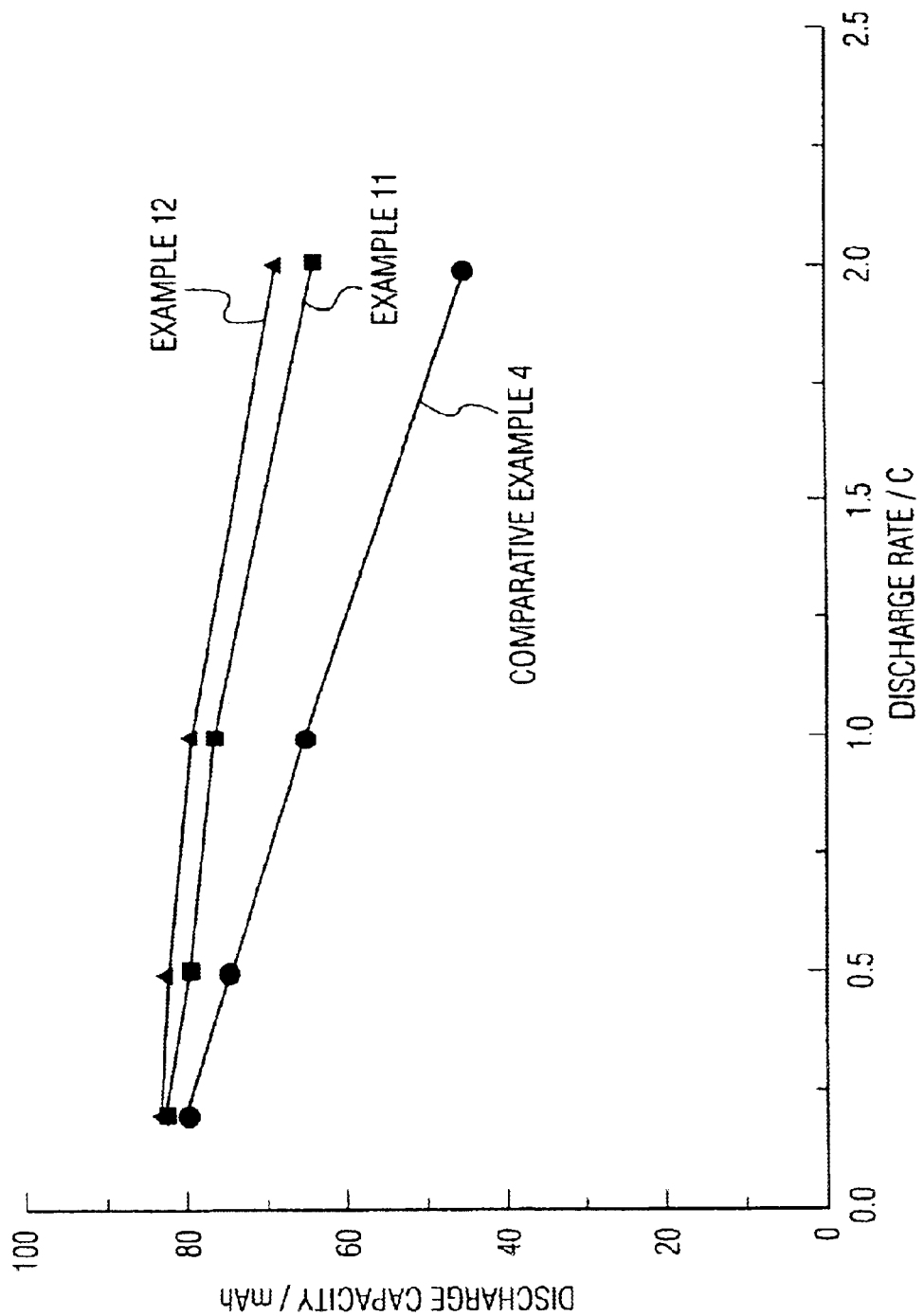
FIG. 11 is a diagram showing discharge capacity for discharge rate in a lithium polymer secondary battery.

The characteristics were evaluated in the batteries thus prepared in examples 11 and 12 and comparative example 4. FIG. 11 shows the discharge capacity in terms of the discharge rate plotted on the axis of abscissas. The discharge end voltage was 3 V. As a result, as compared with the battery not containing $Al_2O_3$ particles in comparative example, the battery of example 11 mixing $Al_2O_3$ particles in the positive electrode of the invention was extremely enhanced in the discharge capacity at the high discharge rate. Moreover, in the battery of example 12 mixing $Al_2O_3$ particles also in the polymer electrolyte, the discharge capacity was further enhanced as compared with the battery of example 11.

In the embodiments, $LiPF_6$ was used as the solute of nonaqueous electrolyte solution, but it may be replaced by other lithium salt, such as $LiCF_3SO_3$, $LiClO_4$, $LiN(CF_3SO_2)$, $LiAsF_6$, or $LiBF_4$.

Also in the embodiments, as the solvent of the nonaqueous electrolyte solution, a mixed solvent of propylene carbonate and ethylene carbonate, and a mixed solvent of ethylene carbonate and ethyl methyl carbonate were used, but other organic solvents or their mixed solvents may be used.

As the positive electrode active substance of the embodiments, $V_6O_{13}$ and $LiCoO_2$ were used, but they may be also replaced by $MnO_2$, $Li_{1+x}Mn_2O_4$ (0×0.1), $LiNiO_2$, $LixMnO_2$ (0×0.5), and other lithium transition metal composite compound.

Lithium metal and graphite powder were used in the negative electrode of the embodiments, but other carbon material, metal oxide, metal nitride, and other metal compounds may be also used.

In the embodiments, as ceramic fine particles, $Al_2O_3$ were used, but same effects were obtained by using $SiO_2$, $ZrO_2$, MgO, and $Na_2O$.

Ceramic particles were used in the embodiments, but the shape of particles is not limited to granular form, but same effects were obtained in fibrous ceramic particles having a wide specific surface area.

Thus, according to the invention, by mixing ceramic particles in the positive and/or negative electrode, the electrode capacity was enhanced particularly in high rate discharge. By combining the positive and negative electrodes for lithium battery and the electrolyte, the lithium secondary battery of high capacity was obtained.

What is claimed is:

1. A non-aqueous lithium ion secondary battery comprising:

a positive electrode comprising a lithium transition metal compound oxide;

a negative electrode which is negative during discharging of the battery, the negative electrode comprising an active substance that occludes and releases lithium ions;

a microporous polymer film separator between the positive electrode and the negative electrode; and a nonaqueous electrolyte solution comprising a nonaqueous solvent and a lithium salt dissolved therein;

wherein:

the negative electrode comprises ceramic particles not relating to the charge and discharge reactions of the battery;

the negative electrode comprises 5 to 20 parts by weight of the ceramic particles in 100 parts by weight of the active substance;

the ceramic particles are $Al_2O_3$ particles;

the lithium salt is $LiPF_6$; and the particle size of the ceramic particles is 1 micron or less.

2. The battery of claim 1 in which the lithium transition metal compound oxide is $LiCoO_2$.

3. A lithium polymer secondary battery according to claim 1, wherein the content of said ceramic particles is between 5 and 10 parts by weight.

4. A lithium polymer secondary battery according to claim 1, wherein the active substance that occludes and releases lithium ions is graphite, and the nonaqueous solvent comprises ethylene carbonate.

5. A lithium polymer secondary battery according to claim 4, wherein the nonaqueous solvent is a mixture of ethylene carbonate and ethyl methyl carbonate.

6. A lithium polymer secondary battery according to claim 5, wherein the content of said ceramic particles is between 5 and 10 parts by weight.

* * * * *

UNITED STATES PATENT AND TRADEMARK OFFICE
CERTIFICATE OF CORRECTION

PATENT NO. : 6,905,796 B2
DATED : June 14, 2005
INVENTOR(S) : Ishida et al.

It is certified that error appears in the above-identified patent and that said Letters Patent is hereby corrected as shown below:

<u>Title page,</u>
Item [56], References Cited, FOREIGN PATENT DOCUMENTS, delete
"JP   07-153495    6/1995"; and
"JP   08-321301    12/1996".

Signed and Sealed this

Twenty-ninth Day of November, 2005

JON W. DUDAS
*Director of the United States Patent and Trademark Office*